United States Patent [19]

Ruppnig

[11] 4,303,523
[45] Dec. 1, 1981

[54] DEWATERING DRUM

[75] Inventor: Herbert Ruppnig, Hauptplatz 3, Austria

[73] Assignee: Voest-Alpine Aktiengesellschaft, Vienna, Austria

[21] Appl. No.: 109,108

[22] Filed: Jan. 2, 1980

[30] Foreign Application Priority Data

Jan. 8, 1979 [AT] Austria ................................. 127/79

[51] Int. Cl.³ .......................................... B01D 33/04
[52] U.S. Cl. .................................. 210/386; 210/401; 210/DIG. 3
[58] Field of Search ................. 210/400, 401, DIG. 3, 210/386

[56] References Cited

U.S. PATENT DOCUMENTS

| | | | |
|---|---|---|---|
| 954,466 | 4/1910 | Robinson | 210/401 X |
| 3,419,150 | 12/1968 | Davis | 210/401 |
| 4,159,947 | 7/1979 | Brooks et al. | 210/401 X |

*Primary Examiner*—John Adee
*Attorney, Agent, or Firm*—Cushman, Darby & Cushman

[57] ABSTRACT

Figure 3:
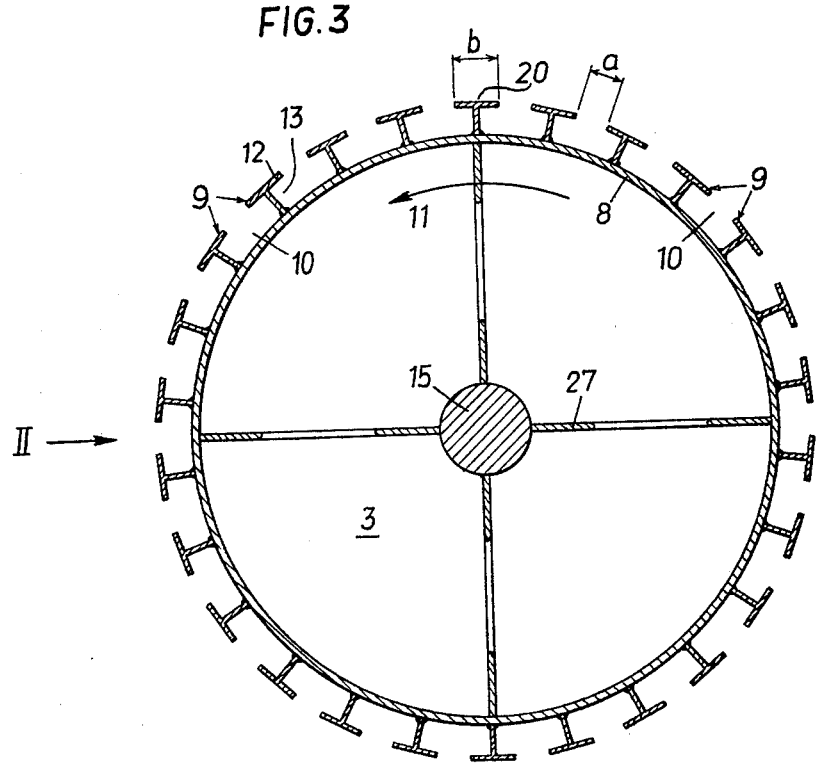

The dewatering drum 3 for devices for dewatering aqueous suspensions of solid material, particularly for sieve belt presses, has a closed shell 8. Profiles 9 are fixed to this closed shell 8 for forming shells 13 obliquely extending relative to the generatrix of the drum shell 8. The channels 13 deviate from the direction of the generatrix and extend either obliquely relative to the generatrix or are arranged in an arrow-like or arcuate manner, noting that the arrow tip or the culminating point 14 of the arc is showing in direction 11 of rotation (FIG. 3).

7 Claims, 4 Drawing Figures

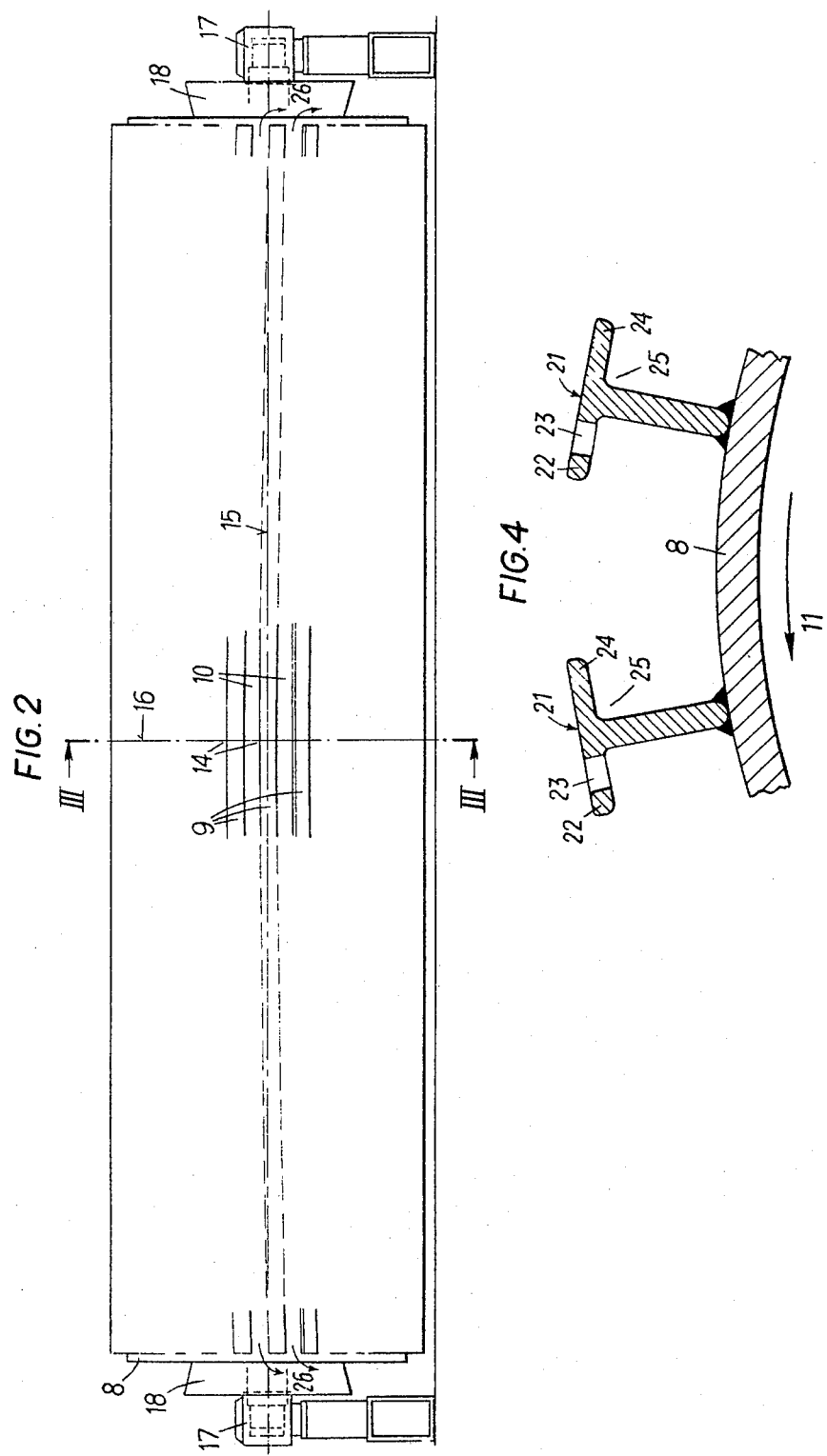

DEWATERING DRUM

The present invention refers to a dewatering drum for devices for dewatering aqueous suspensions of solid material, in which the aqueous suspension of solid material is passed between sieve belts over at least one dewatering drum, noting that the sieve belts are contacting the dewatering drum over at least part of its circumference. Such dewatering devices can be used for dewatering any aqueous suspensions of solid material, for example sewage sludge and so on, or in the paper production. In known devices of this kind the dewatering drums are formed of sieve drums over which the aqueous suspension of solid material is passed between sieve belts or bands. Between the sieve belts the water is pressed out from the material to be dewatered and is flowing through perforations provided in the seive drums into the interior of the sieve drums. In known devices, a trough is provided within the sieve drum for receiving the water pressed out of the solid material. Such a trough does, however, only uncompletely receive the water so that a sump is formed in the interior of the sieve drum. The sieve belts are in most cases passed also over the lower portion of the sieve drum and thus the water pressed out from the solid material is again flowing from the interior of the drum into the already dewatered material so that the dewatering effect becomes reduced. There results also the additional disadvantage that the interior of the drum becomes severely contaminated by the sludge.

The present invention now aims at avoiding this disadvantage and essentially consists in that the shell of the dewatering drum is water-impermeable and is provided on its circumference with grooves extending approximately in axial direction. In view of the drum shell being water-impermeable, no water can accumulate within the interior of the dewatering drum which could otherwise again impregnate the already dewatered material. The water is collected within said groove and is flowing off through these grooves in axial direction. Conveniently said grooves are arranged such that they obliquely extend in direction to at least one front end of the dewatering drum and relative to the generatrices of the drum shell in a leading manner with respect to the direction of rotation. Such oblique arrangement of the groove does favourize the removal of the water collected within the grooves. According to the invention, the grooves preferably extend, with respect to both front ends of the drum, obliquely to the generatrices of the drum shell and in a leading fashion to the rotational direction thereof, so that the flowing paths in direction to both front ends are of equal length. A better effect with respect to water removal can already be achieved if only the end portions of the grooves are obliquely extending relative to the generatrices of the drum shell. According to a preferred embodiment of the invention, said grooves extend in an arrow-like manner or arcuate manner, noting that the arrow tip or the culminating point of the arc is showing in a direction opposite to the direction of rotation of the drum. In this case it has proved advantageous if the grooves includes at the area of the front end or of the front ends of the drum an angle of 1° to 3°, preferably an angle of 2° to 2.5°, with the generatrices of the drum shell.

Preferably the first dewatering drum, over which the aqueous suspension to be dewatered is passed between sieve belts, is designed according to the invention because of this location the major part of the water becomes pressed off. The sieve belts will contact said first sieve drum in its upper portion, thereby enclosing the material to be dewatered and partially surround the drum, as a rule, over more than half of the circumference of the drum.

According to a preferred embodiment of the invention, the grooves are delimited by ribs or straps which comprise on the portions of the circumference of the dewatering drum contacting the sieve band a rim extending in opposite direction to the direction of rotation. In this manner the area exerting pressing pressure is kept relatively large and the gaps between these ribs or straps can be kept small. Said rims provide relatively great flow passages through which the water removed can flow off. According to a preferred embodiment of the invention, the ribs or straps have a T-shaped cross section, noting that the cross beam of this T-shaped cross section is forming part of the circumference of the dewatering drum contacting the sieve band. Said cross beams of the T-shaped cross section are forming the pressurizing areas and the pressure force acting on these cross beams becomes relatively high. By selecting a T-shaped cross section, the forces acting on the ribs or straps are, at the center portion thereof, supported by the radially extending portion of the T-shaped cross section so that relatively high pressure forces can be resisted with even a weak design of the ribs or straps. In this manner, that portion of the cross beam of the T-shaped cross section which extends opposite to the direction of rotation is forming the channel for removing the water pressed out of the solid material, whereas that portion of the cross beam which extends in direction of rotation does counteract the pressure force but does not delimit the channel removing the water. According to the invention, the portion of the cross beam of the T-shaped cross section extending in direction of rotation can be provided with perforations or holes so that the water pressed out of the material can also flow through this perforation or holes into said channel. In a particularly simple construction of the embodiment according to the invention, the ribs or straps are formed of T-shaped profiles welded to the drum shell.

The water emerging from the channels is flowing off along the front wall of the drum and would thus reach the area of the bearings of the drum axis. Therefor and according to the invention, the drum axis is surrounded by protecting tubes tightly connected with the front walls of the drum and preferably enlarging in a trumpet-like manner, the tubes repelling the water flowing out from the grooves from the drum axis and the bearings of this axis. The invention is further illustrated with reference to the drawing showing an embodiment of the invention.

In the drawing

Figure 1:
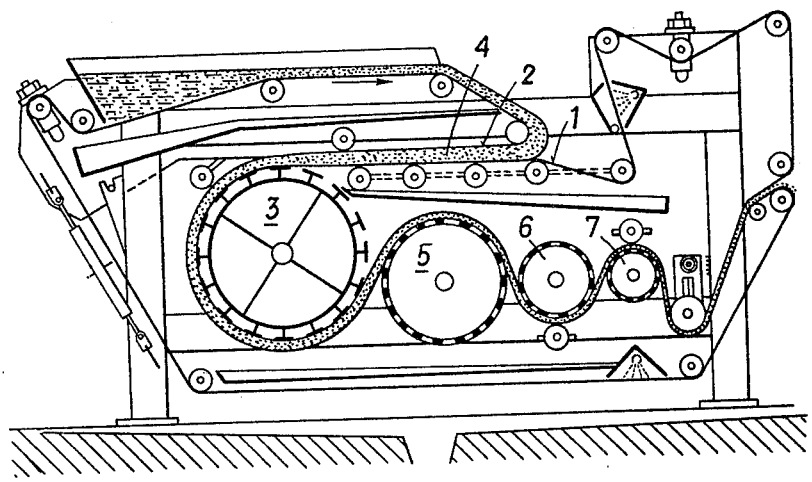

FIG. 1 shows a dewatering machine for dewatering aqueous suspensions of solid material, FIG. 2 shows a lateral view in direction of arrow II of FIG. 3, FIG. 3 shows a section along line III-III of FIG. 2 in an enlarged scale and FIG. 4 shows a detail along line III-III of FIG. 2 in an enlarged scale. As is shown in FIG. 1, the seive belts 1, 2 are passed together with the solid material 4 to be dewatered over the first dewatering drum 3 which is designed according to the invention. Subsequently, the sieve belts are, together with the solid material already dewatered to a great extent, passed over further drums 5, 6 and 7 which are sieve drums of usual construction.

The dewatering drum 3 is shown in FIGS. 2 and 3. The dewatering drum 3 is non-perforated so that no water can enter. T-Profiles 9 are welded to the drum shell 8 and form ribs or straps delimiting the grooves 10. By the portions 12 of the cross beams of the T-profiles which extend in opposite direction to the direction of rotation indicated by arrow 11, channels 13 are formed through which the water can flow in direction to the front walls.

As is shown in FIG. 2, the grooves 10 extend along arcs, noting that the culminating points 14 of the arcs are showing in opposite direction to the direction 11 of rotation and are located in the center plane 16 extending vertically relative to the drum axis 15. The water removed can thus flow off from the lateral ends of said both channels. For protecting the bearing 17 of the drum axis, a trumpet-like tapering protecting tube 18 is tightly connected with the front walls of the drum.

As a matter of course, arrow-shaped T-profiles can be provided in place of the arcuate T-profiles, noting that the leading distance of the lateral ends of these profiles is, with respect to the center portion, approximately 5 cm for a drum having a width of approximately 1,4 m (axial length 1,4 m).

As can be seen in FIG. 3, the free gaps 19 between the rims 12 and 9 of adjacent T-profiles have approximately the same width as is the width of the cross beams of the T-profiles. The width a of said gaps is, however at most equal to the width b of the symmetrically shaped crossbeams of the T-profiles, preferably smaller. With unsymmetrically shaped T-profiles, the width a is at most equal the sum of the cantilever of the cross-beam portions of adjacent T-profiles facing one another, as measured along the circumference. In any case, the cross beams 20 of the T-profiles 9 the circumferential width of which has been designated b, form that portion of the circumference of the dewatering drum which contacts the sieve band.

In place of T-profiles also other profiles can be used with a similar effect. Examples for such profiles are particularly L-profiles, U-profiles, I-profiles, C-profiles and Z-profiles.

FIG. 4 shows T-profiles 21 in an enlarged scale, said profiles being welded onto the closed shell 8 of the dewatering drum. The direction of rotation of this drum is again indicated by the arrow 11.

The rims 22 of the T-profiles 21, which extend in direction 1 of rotation, are provided with perforations 23 which further improve the dewatering effect. The rim 24 extending in opposite direction to the direction of rotation of the drum is non-perforated or solid in any case for forming a channel 25 for receiving the water and for feeding this water in direction to the front faces of the drum. The flow direction of the water is indicated by arrows 26 in FIG. 2.

The shell 8 of the drum 3 is kept at the proper distance from the shaft 15 by ribs 27 as is shown in FIG. 3.

The material for the shell of the drum and the T-profiles is as a rule any steel. Preferably, the outer surface of the drum is, after sand blasting, provided with a layer of synthetic plastics material.

What is claimed is:

1. Dewatering drum for devices for dewatering aqueous suspensions of solid material, in which the aqueous suspension of solid material is passed between sieve belts over at least one rotatable dewatering drum, the sieve belts contacting the dewatering drum over at least part of its circumference, characterized in that the shell of the dewatering drum is water-impermeable and is provided on its circumference with grooves extending approximately in axial direction, said grooves being formed between ribs or straps which comprise on the portions of the circumference of the dewatering drum contacting the sieve band rims extending in opposite direction to the direction of drum rotation, said grooves extending obliquely, relative to the generatrices of the drum shell, in a leading manner with respect to the direction of rotation and in direction to at least one front end of the drum.

2. Dewatering drum as claimed in claim 1 characterized in that the grooves include at the area of the front end or of the front ends of the drum an angle of 1° to 3° with the generatrices of the drum shell.

3. Dewatering drum as in claim 1 wherein the grooves include as the area of at least one end of the drum an angle of 2° to 2.5° with the generatrices of the drum shell.

4. A rotatable dewatering drum for dewatering aqueous suspensions of solid material carried between sieve belts which contact the drum over at least part of the drum circumference, said drum comprising a cylindrical water-impermeable shell and a plurality of circumferential spaced apart ribs or straps projecting outwardly from the shell and extending approximately in axial direction, said ribs or straps including rims spaced from said shell and projecting in a direction opposite to the direction of drum rotation, whereby said ribs or straps form between them and with the exterior of said shell a plurality of grooves which extend approximately axially with respect to the drum.

5. Dewatering drum for devices for dewatering aqueous suspensions of solid material, in which the aqueous suspension of soid material is passed between sieve belts over at least one rotatable dewatering drum, the sieve belts contacting the dewatering drum over at least part of its circumference, characterized in that the shell of the dewatering drum is water-impermeable and is provided on its circumference with grooves extending approximately in axial direction, said grooves being formed between ribs or straps which comprise on the portions of the circumference of the dewatering drum contacting the sieve band a rim extending in opposite direction to the direction of drum rotation, said ribs or straps having a T-shaped cross-section, the cross beams of the T forming that portion of the drum which contacts the sieve belt.

6. Dewatering drum as in claim 5 wherein that portion of the cross beam of the T which extends in the direction of rotation is perforated.

7. Dewatering drum for devices for dewatering aqueous suspensions of solid material, in which the aqueous suspension of solid material is passed between sieve belts over at least one rotatable dewatering drum, the sieve belts contacting the dewatering drum over at least part of its circumference, characterized in that the shell of the dewatering drum is water-impermeable and is provided on its circumference with grooves extending approximately in axial direction, said grooves being formed between ribs or straps which comprise on the portions of the circumference of the dewatering drum contacting the sieve band a rim extending in opposite direction to the direction of drum rotation, the ribs or straps having T-shaped profiles and being welded to the drum shell.

* * * * *